(12) United States Patent
Su et al.

(10) Patent No.: US 11,380,939 B2
(45) Date of Patent: Jul. 5, 2022

(54) HYBRID LITHIUM ION CAPACITOR BATTERY HAVING A CARBON COATED SEPARATE LAYER AND METHOD OF MAKING THE SAME

(71) Applicant: GM Global Technology Operations LLC, Detroit, MI (US)

(72) Inventors: Qili Su, Shanghai (CN); Dewen Kong, Shanghai (CN); Yong Lu, Shanghai (CN); Zhe Li, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 16/646,855

(22) PCT Filed: May 18, 2018

(86) PCT No.: PCT/CN2018/087398
§ 371 (c)(1),
(2) Date: Mar. 12, 2020

(87) PCT Pub. No.: WO2019/218327
PCT Pub. Date: Nov. 21, 2019

(65) Prior Publication Data
US 2021/0012975 A1 Jan. 14, 2021

(51) Int. Cl.
*H01G 11/32* (2013.01)
*H01G 11/06* (2013.01)
(Continued)

(52) U.S. Cl.
CPC ........ *H01M 10/0587* (2013.01); *H01G 11/06* (2013.01); *H01G 11/28* (2013.01);
(Continued)

(58) Field of Classification Search
None
See application file for complete search history.

(56) References Cited

U.S. PATENT DOCUMENTS 6,252,762 B1 6/2001 Amatucci
6,468,698 B1 10/2002 Hamano et al.
(Continued)

FOREIGN PATENT DOCUMENTS

| CN | 104103791 A | 10/2014 |
| CN | 105350054 A | 2/2016 |
| JP | 2007213948 A | 8/2007 |

OTHER PUBLICATIONS

CN 104103791 English translation. Li et al. China. Oct. 15, 2014. (Year: 2014).*

*Primary Examiner* — Christopher P Domone
(74) *Attorney, Agent, or Firm* — Vivacqua Crane PLLC

(57) ABSTRACT

A hybrid lithium ion capacitor battery and method of making the same is disclosed. The hybrid lithium ion capacitor battery includes a positive electrode separated from a negative electrode by a separator layer. A first activated carbon layer is disposed between the separator layer and one of the positive and negative electrodes. The first activated carbon layer is coated on a first surface of the separator layer. A second activated carbon layer is disposed between the separator layer and the other of the positive and negative electrodes. The second activated carbon layer is coated on a second surface of the separator layer. A first current collector coextensively contacts the first electrode and a second current collector coextensively contacts the second electrode. An electrolytic solution carries lithium cations between the positive and negative electrodes through the activated carbon coated separator layer.

12 Claims, 6 Drawing Sheets

(51) Int. Cl.

| | |
|---|---|
| *H01G 11/28* | (2013.01) |
| *H01G 11/52* | (2013.01) |
| *H01M 10/0587* | (2010.01) |
| *H01M 50/446* | (2021.01) |
| *H01M 12/02* | (2006.01) |
| *H01M 4/587* | (2010.01) |
| *H01M 50/411* | (2021.01) |
| *H01M 50/449* | (2021.01) |
| *H01M 4/13* | (2010.01) |
| *H01M 4/04* | (2006.01) |
| *H01M 4/139* | (2010.01) |
| *H01M 50/434* | (2021.01) |
| *H01M 50/489* | (2021.01) |
| *H01M 50/46* | (2021.01) |
| *H01M 10/0525* | (2010.01) |

(52) U.S. Cl.
CPC ............ *H01G 11/32* (2013.01); *H01G 11/52* (2013.01); *H01M 4/04* (2013.01); *H01M 4/0435* (2013.01); *H01M 4/13* (2013.01); *H01M 4/139* (2013.01); *H01M 4/587* (2013.01); *H01M 12/02* (2013.01); *H01M 50/411* (2021.01); *H01M 50/434* (2021.01); *H01M 50/446* (2021.01); *H01M 50/449* (2021.01); *H01M 50/46* (2021.01); *H01M 50/489* (2021.01); *H01M 10/0525* (2013.01)

(56) References Cited

U.S. PATENT DOCUMENTS

| | | |
|---|---|---|
| 2010/0319187 A1 | 12/2010 | Kim et al. |
| 2012/0308872 A1 | 12/2012 | Huang |
| 2015/0318530 A1* | 11/2015 | Yushin ................. H01M 12/00 429/131 |
| 2016/0164060 A1* | 6/2016 | Zhang ................. H01M 50/409 429/145 |
| 2017/0004930 A1* | 1/2017 | Picot ..................... H01G 11/62 |
| 2017/0331115 A1* | 11/2017 | Saito ..................... C08F 14/185 |

\* cited by examiner

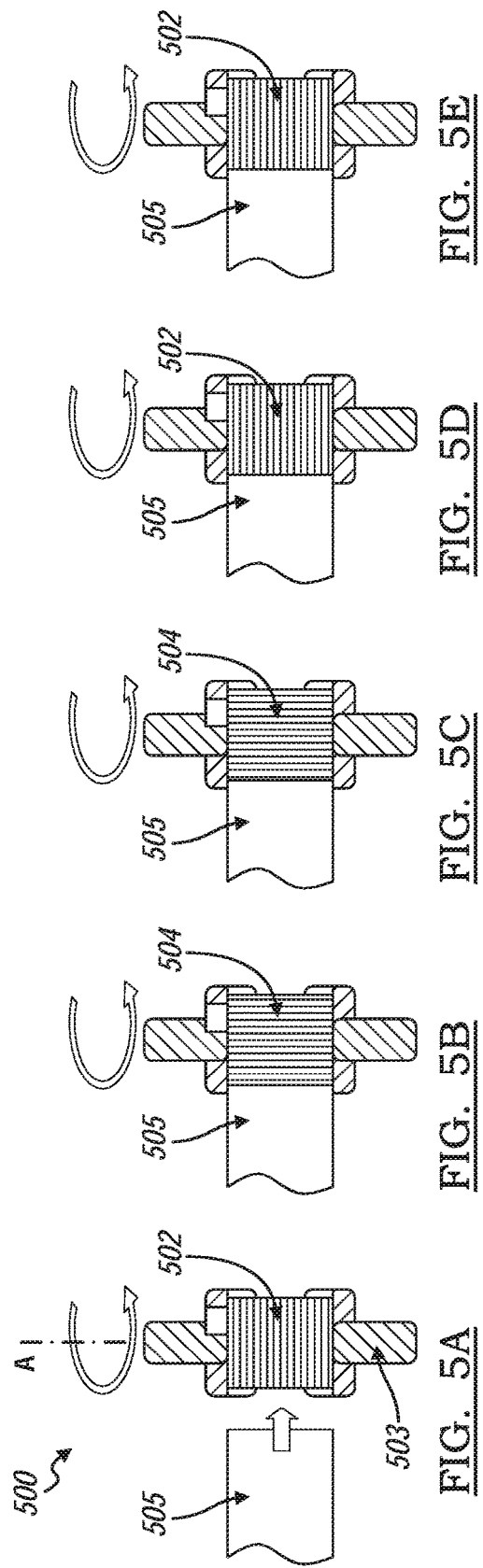
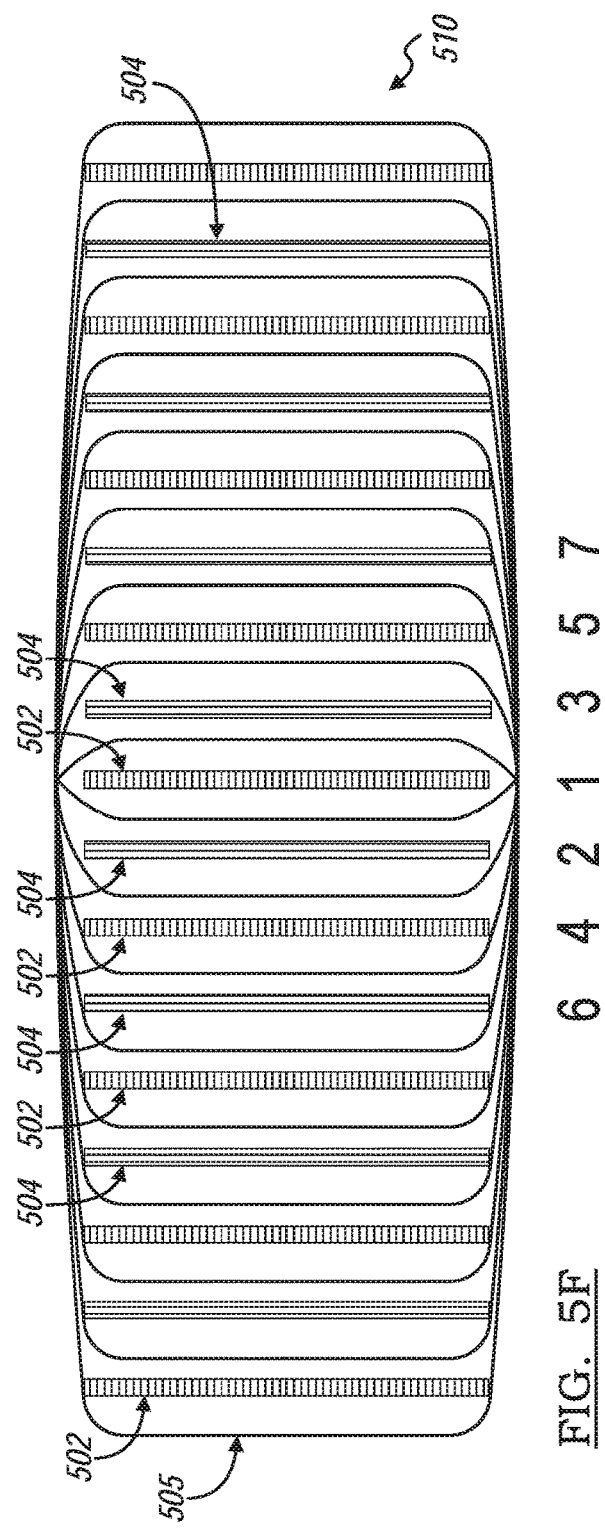

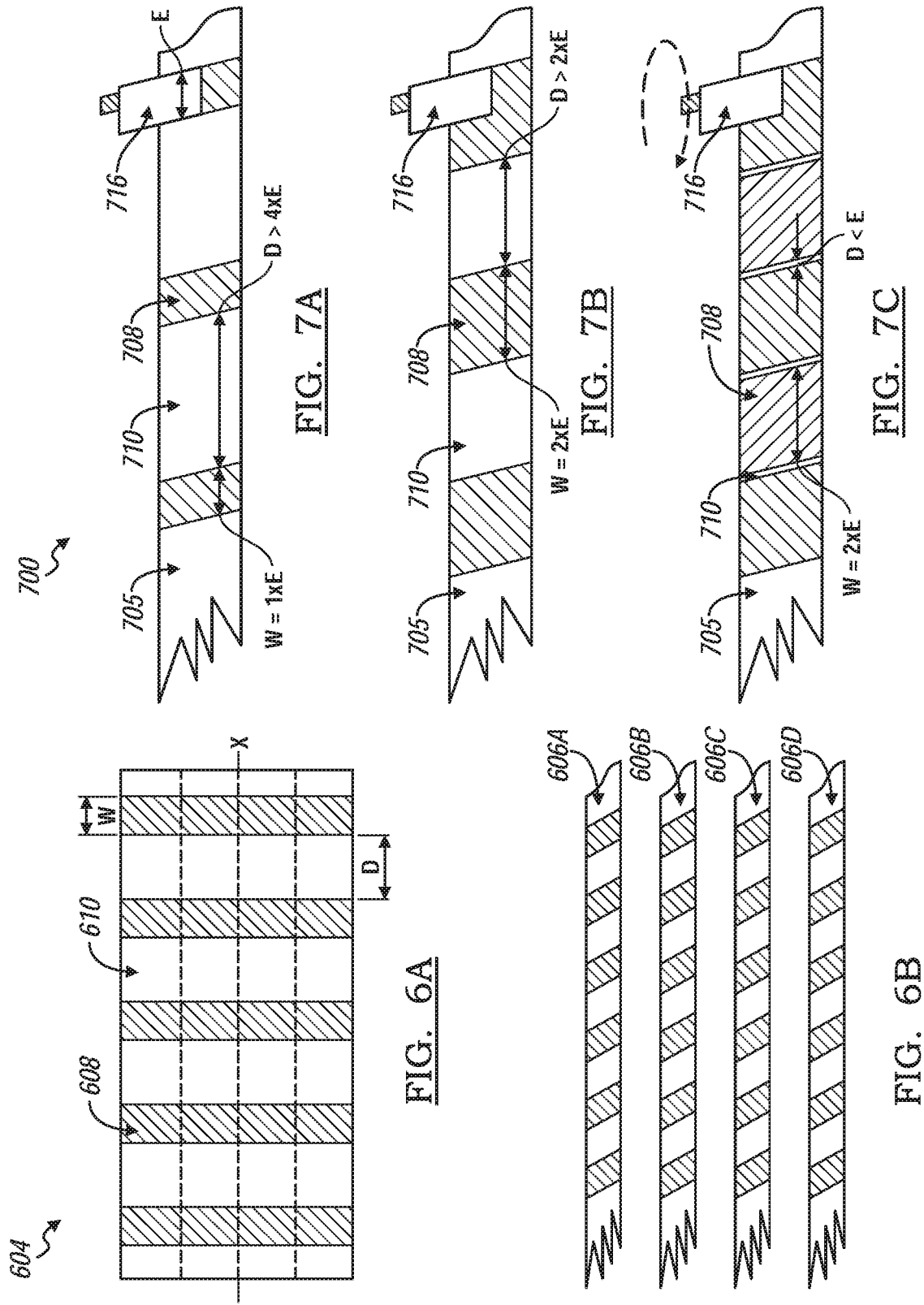

HYBRID LITHIUM ION CAPACITOR BATTERY HAVING A CARBON COATED SEPARATE LAYER AND METHOD OF MAKING THE SAME

INTRODUCTION

The present disclosure relates generally to a capacitor assisted battery, and more specifically, to a hybrid lithium ion capacitor battery having an activated carbon coated separator and a method of making the same.

Rechargeable lithium-ion batteries are known to be used in consumer electronic applications from small electronic devices, such as cell phones to larger electronic devices such as laptop computers. A typical lithium-ion battery is formed of an anode layer, a cathode layer, and a separator layer separating the anode layer and cathode layer. The lithium-ion battery also includes an electrolyte formulated to carry lithium cations (Li+) between the cathode layer and anode layer when the lithium-ion battery is being charged or discharged.

Due to the desirable characteristics of lithium ion batteries, such as the ability to hold a relatively high energy density as compared to nickel metal hydride, nickel cadmium, or lead acid batteries, and the ability to be completely or partially charged and discharged over many cycles without retaining a charge memory, the use of lithium ion batteries is expanded to larger electric equipment such as hybrid vehicles and electric vehicles. For such larger applications, there is a need for a rechargeable battery that has high-energy and high-power density capacities.

Thus, while lithium ion batteries achieve their intended purpose, there is a need for both high energy density normally associated with lithium ion batteries and high power density typically of capacitors, as well as long operating life over numerous recharge cycles in the areas of transportation technologies where high charge and discharge rates are required.

SUMMARY

According to several aspects, a battery is disclosed. The battery includes a separator layer having a first surface, a first electrode spaced apart from the first surface of the separator layer, and a first activated carbon layer disposed between the separator and the first electrode.

In an additional aspect of the present disclosure, wherein the activated carbon layer is in contact with the first electrode.

In another aspect of the present disclosure, the battery further includes a first current collector having a conductive foil coextensively contacting the first electrode.

In another aspect of the present disclosure, the first activated carbon layer is coated onto the first surface of the separator layer.

In another aspect of the present disclosure, the battery further includes a ceramic layer coated onto the first surface of the separator layer. The activated carbon layer is coated onto the ceramic layer such that the ceramic layer is sandwiched between the separator layer and the activated carbon layer.

In another aspect of the present disclosure, the battery further includes a second electrode spaced apart from a second surface of the separator, wherein the second surface of the separator layer is facing in a direction opposite of the first surface, a second activated carbon layer disposed between the second electrode and the second surface of the separator layer, and a second current collector having a conductive foil coextensively contacting the second electrode.

In another aspect of the present disclosure, the second activated carbon layer is in contact with the second electrode.

In another aspect of the present disclosure, the second activated carbon layer is coated onto the second surface of the separator layer.

In another aspect of the present disclosure, the battery further includes a second electrode and a second activated carbon layer. The first activated carbon layer is coated onto the first surface of the separator layer and in direct contact with the first electrode. The second activated carbon layer is coated onto a second surface of the separator layer opposite the first surface and in direct contact with the second electrode.

In another aspect of the present disclosure, one of the first electrode and the second electrode includes a lithium-based active material and the other of the first electrode and the second electrode includes a graphite.

According to several aspects, a coated separator layer for a battery is disclosed. The coated separator layer includes a separator sheet having a porous inert polymer material having a first surface and an activated carbon coating adjacent the first surface.

In an additional aspect of the present disclosure, the activated carbon coating is directly contacting the first surface of the separator sheet.

In another aspect of the present disclosure, the coated separator layer further includes a ceramic coating on the first surface of the separator sheet. The activated carbon coating is on the ceramic layer such that the ceramic coating is sandwiched between the activated carbon coating and separator sheet.

In another aspect of the present disclosure, the separator sheet includes a thickness of about 20 microns, the activated carbon coating includes a thickness of between about 0.5 to 25 microns, and the ceramic coating includes a thickness of between about 0.5 to 5 microns.

In another aspect of the present disclosure, the separator sheet includes a plurality of segments of the activated carbon coating along the separator sheet.

According to several aspects, a method of making a battery is disclosed. The method includes the steps of placing a first-type electrode onto a stacking platform rotatable about an A-axis; placing a first portion of a separator sheet onto the first type electrode thus covering the first type electrode, wherein the separator sheet includes a first surfaced coated with an activated carbon layer; and winding the first-type electrode and the first portion of the separator sheet about the A-axis thus advancing a second portion of the separator sheet onto the stacking platform.

In another aspect of the present disclosure, the method further includes the steps of placing a first second-type electrode onto second portion of the separator sheet; winding the first second-type electrode and the second portion of the separator sheet about the A-axis thus advancing a third portion of the separator sheet onto the stacking platform; placing a second second-type electrode onto third portion of the separator sheet; and winding the second second-type electrode and the third portion of the separator sheet about the A-axis such that the first-type electrode is sandwiched within the first second-type electrode and the second second-type electrode.

In another aspect of the present disclosure, the first surfaced is coated with a plurality of segments of the activated carbon layer along the separator sheet.

In another aspect of the present disclosure, the activated carbon layer is in direct contact with at least one of the first-type electrode and the first second-type electrode.

In another aspect of the present disclosure, the first-type electrode is one of a cathode and anode, and the second-type electrode is the other of the cathode and anode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 5A-5F is a schematic representation of another alternative embodiment of a method of making a hybrid lithium ion capacitor battery;

FIGS. 6A-6B is a schematic representation of a method of making a separator layer having a non-continuous activated carbon coating; and FIGS. 7A-7C is a schematic representation of a method of manufacturing a hybrid lithium ion capacitor battery having a non-continuous activated carbon coated separator.

DETAILED DESCRIPTION

The following description is merely exemplary in nature and is not intended to limit the present disclosure, application, or uses. The illustrated embodiments are disclosed with reference to the drawings, wherein like numerals indicate like or corresponding parts throughout the several drawings. The figures are not necessarily to scale and some features may be exaggerated or minimized to show details of particular features. The specific structural and functional details disclosed are not to be interpreted as limiting, but as a representative basis for teaching one skilled in the art as to how to practice the disclosed concepts.

Figure 1:
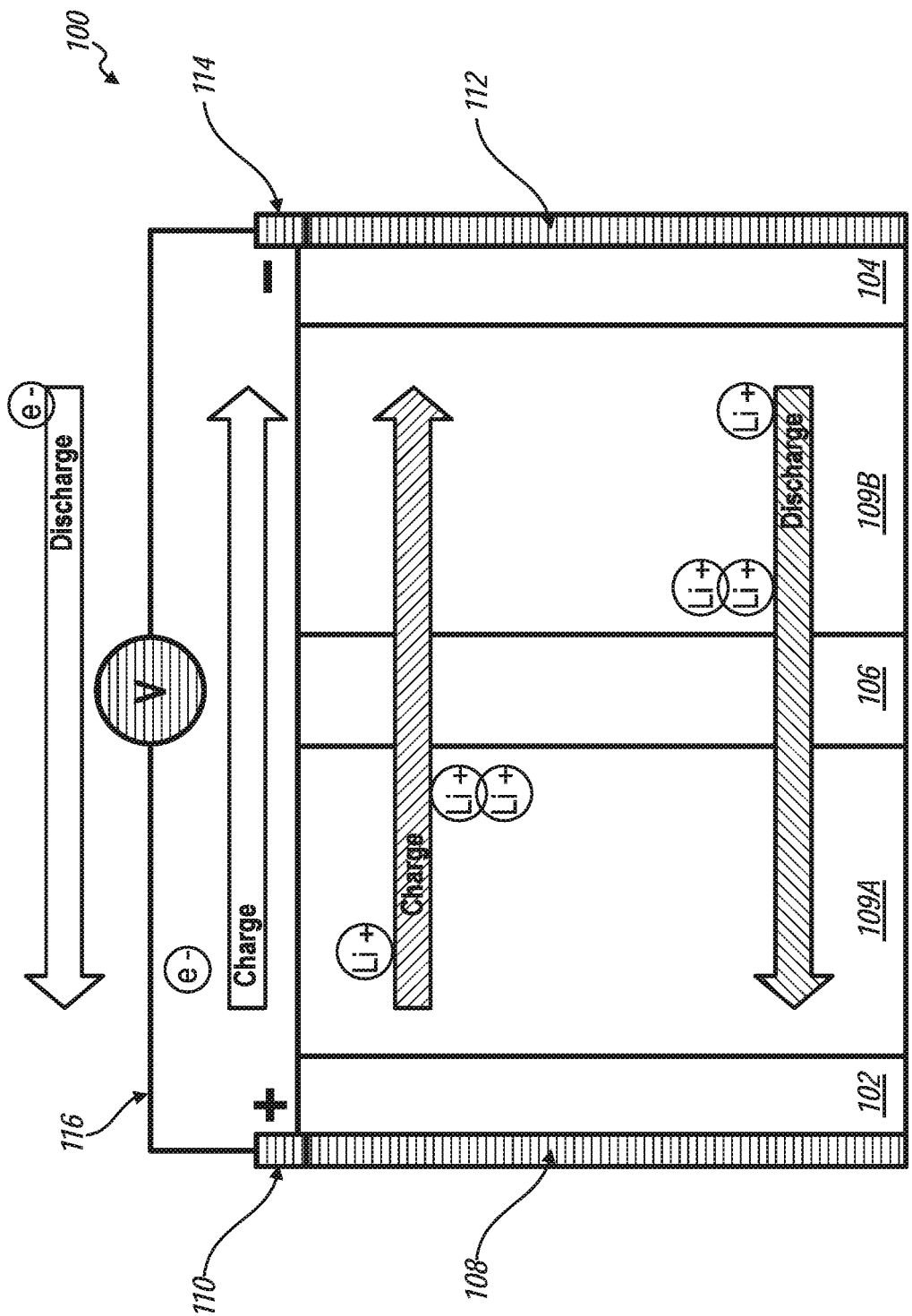
FIG. 1 is a schematic representation of a hybrid lithium ion capacitor battery, according to an exemplary embodiment.

FIG. 1 shows a schematic representation of a hybrid lithium ion capacitor battery, according to an exemplary embodiment, generally indicated by reference number 100. The hybrid lithium ion capacitor battery, also referred to as a hybrid battery 100, includes a positive electrode 102 separated from a negative electrode 104 by a separator layer 106. A first activated carbon layer 109a is disposed between the positive electrode 102 and the separator layer 106. The first activated carbon layer 109a is in direct contact with the positive electrode 102. A second activated carbon layer 109b is disposed between the separator layer 106 and the negative electrode. The second activated carbon layer 109b is in direct contact with the negative electrode 104. An electrolytic solution, such as lithium hexafluorophosphate (LiPF6) in a suitable organic solution, is provided in the hybrid battery 100 to carry lithium cations (Li+) between the positive electrode 102 and the negative electrode 104 through the separator layer 106 and the two activated carbon layers 109a, 109b.

The positive electrode 102 is electrically connected to a positive electrode current collector 108, which is electrically connected to a positive polarity tab 110. Similarly, the negative electrode 104 is electrically connected to a negative electrode current collector 112, which is electrically connected to a negative polarity tab 114. For clarity of illustration and description, the positive and negative polarity tabs 110, 114 are shown electrically coupled to a simple electrical circuit 116 having a reversible voltage potential V. The electric circuit 116 may include a power-consuming and power-generating devices. A power-consuming device is one that is powered by the hybrid battery 100, such as the electric motor of an electric or hybrid vehicle, resulting in the discharge of the hybrid battery 100. Conversely, a power-generating device is one that recharges the hybrid battery 100, such as an electrical charge outlet of a charging facility or an alternator of a hybrid vehicle.

When the hybrid battery 100 is at least partially charged, the negative electrode 104 contains a greater quantity of intercalated lithium ions (Li+) than the positive electrode 102 and the second activate carbon layer 109b contains a quantity of adsorbed lithium ions (Li+) while the first activate carbon layer 109a contains a quantity of adsorbed anion such as hexafluorophosphate anion (PF6−). As the hybrid battery 100 is discharging, the electrochemical potential difference between the positive side, including the positive electrode 102 and first activated carbon layer 109a, and the negative side, including the negative electrode 104 and the second activated carbon layer 109b, side drives the oxidation of intercalated lithium ions (LI+) contained in the negative electrode 104 and de-adsorption of lithium ion (Li+) and PF6− from the activate carbon. Free electrons (e−) produced by this oxidation reaction and de-adsorption of Li+ from activate carbon 109b are collected by the negative electrode current collector 112 and supplied to the negative polarity tab 114. A flow of free electrons (e−) is harnessed and directed through the circuit 116 from the negative polarity tab 114 to the positive polarity tab 110 and eventually to the positive electrode 102 and first activated carbon layer 109a by way of the positive electrode current collector 108.

Concurrently with the flow of free electrons (e−) from the negative electrode 104 to the positive electrode 102 through the circuit 116 as the hybrid battery 100 discharges, the lithium ions (Li+) are de-adsorbed from the second activated carbon layer 109b and the PF6− are released from the first activate carbon layer 109a. The lithium ions (Li+) are carried through the separator layer 106 by the liquid electrolyte solution in route to the positive electrode 102. The flow of free electrons (e−) through the circuit 116 from the negative polarity tab 114 to the positive polarity tab 110 can be continuously or intermittently provided until the negative electrode 104 is depleted of intercalated lithium and the capacity of the hybrid battery 100 is spent.

The hybrid battery 100 can be charged or re-powered by applying an external voltage originating from the power-generating device to the hybrid battery 100 to reverse the electrochemical reactions that occur during discharge. The applied external voltage compels the otherwise non-spontaneous oxidation of intercalated lithium contained in the positive electrode 102 to produce free electrons (e−) and lithium ions (Li+). The free electrons (e−) are collected by the positive-side current collector 108 and supplied to the positive polarity tab 110. A flow of the free electrons (e−) is directed to the negative polarity tab 114 and eventually to the negative electrode 104 by way of the negative electrode current collector 112. The lithium ions (Li+) are concurrently carried back through the separator layer 106 in the liquid electrolyte solution towards the negative electrode 104. The lithium ions (Li+) and the free electrons (e−) eventually reunite and replenish the negative electrode 104 with intercalated lithium to prepare the hybrid battery 100 for another discharge event.

When the above battery is charging, the positive electrode 102 and negative electrode 104 act like the traditional battery, but the first activated carbon layer 109a will adsorb the anion PF6−, the free electrons (e−) of the first activated carbon layer 109a will be collected by positive-side current collector 108 and supplied to the positive polarity tab 110. A flow of the free electrons (e−) is directed to the negative polarity tab 114 and eventually to the second activated carbon layer 109b by way of the negative electrode current collector 112. In the discharging process, free electrons (e−) produced by lithium ion (Li+) releasing from second activated carbon layer 109b are collected by the negative electrode current collector 112 and supplied to the negative polarity tab 114. A flow of free electrons (e−) is harnessed and directed through the circuit 116 from the negative polarity tab 114 to the positive electrode current collector 108. Concurrently, the PF6− gets de-adsorb to first activated carbon layer 109a.

In other words, when the activated carbon works as part of the positive electrode 102, anions in the electrolyte such as PF6− will adsorb on the surface of first activated carbon layer 109a during charge. However, when activated carbon works as part of negative electrodes 104, lithium ions (Li+) will adsorb on the surface of second activated carbon layer 109b during charge. During discharge processes, PF6− and Li+ de-adsorb from the activated carbon. Although when lithium ions (Li+) goes through the activated carbon, only quite small portion of lithium ions (Li+) may adsorb on the surface, this is a physical process due to the high surface area of activated carbon.

Figure 2:
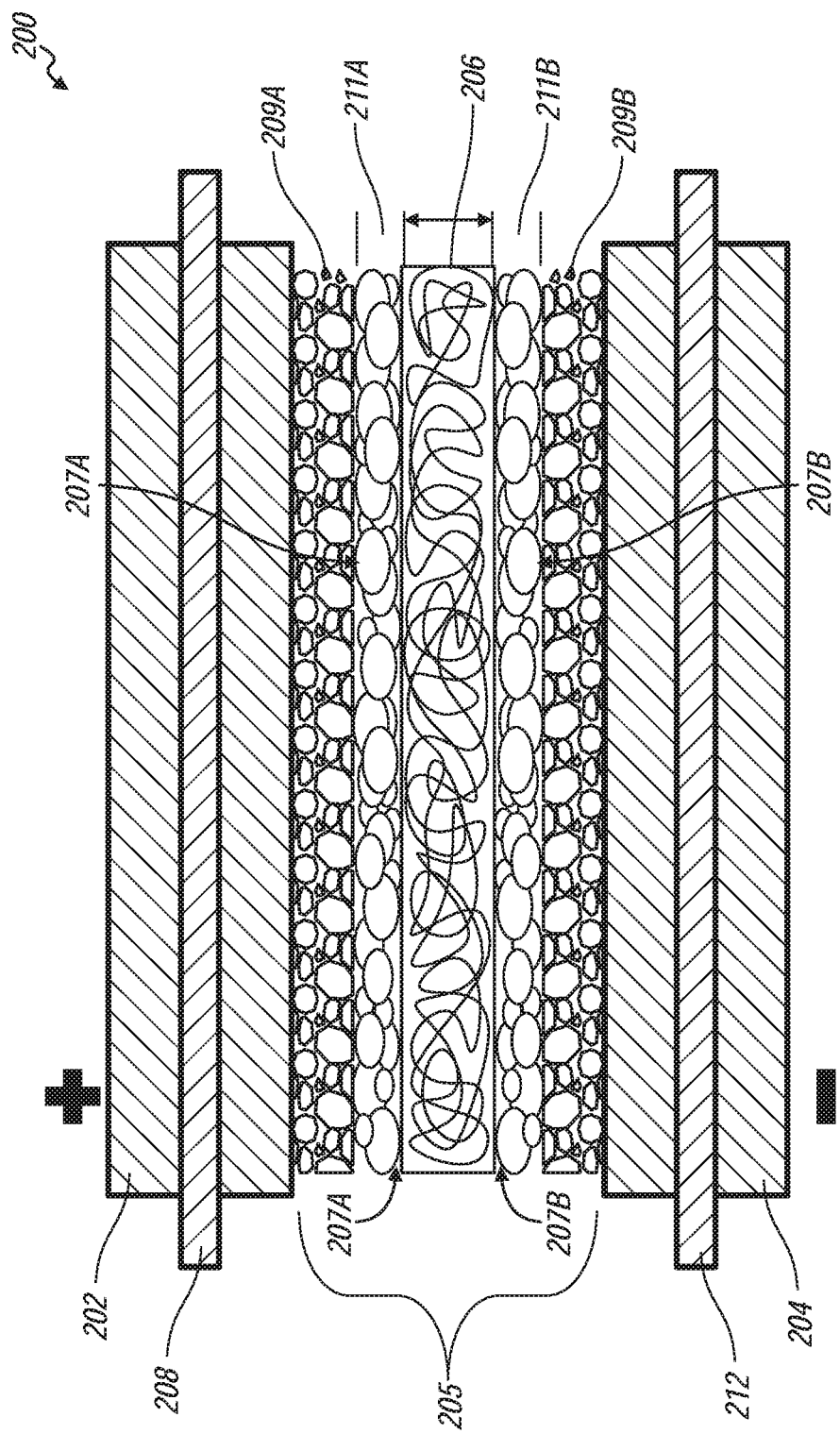
FIG. 2 is a diagrammatic representation of a cell structure of a laminated hybrid lithium ion capacitor battery, according to an exemplary embodiment.

FIG. 2 shows a diagrammatic representation of a hybrid battery cell, generally indicated by reference number 200, of the hybrid battery 100. The hybrid battery cell 200 includes a positive electrode layer 202, a negative electrode layer 204, and a coated separator layer 205 sandwiched between the positive electrode layer 202 and the negative electrode layer 204. A positive electrode current collector 208 is embedded within the positive electrode layer 202 and a negative electrode current collector 212 is embedded within the negative electrode layer 204. The individual layers are sufficiently thin such that the layers may be laminated and folded to form a stacked hybrid battery cell, alternative embodiments of methods of making a hybrid battery having a stacked hybrid battery cell are disclosed in detail below.

The positive electrode layer 202 includes one or more lithium-based active material that is capable of storing intercalated lithium. Examples of such lithium-based active materials include, but are not limited to, lithium cobalt oxide (LiCoO2), lithium manganese oxide (LiMnXOY), nickel-manganese-cobalt oxide [Li(NiXMnYCOz)O2], lithium iron phosphate (LiFePO4), lithium fluorophosphate (Li2FePO4F), lithium nickel oxide (LiNiO2), lithium aluminum manganese oxide (LiXAlYMn1-YO2), and lithium vanadium oxide (LiV2O5). One or more polymeric hinder materials, such as polyvinyldiene fluoride (PVdF), an ethylene propylene diene monomer (EPDM) rubber, or a carboxymethoxy cellulose (CMC) may be intermingled with the lithium-based active material to provide the positive electrode with increased structural integrity. The positive electrode layer 202 may be fabricated by mixing lithium nickel cobalt manganese oxide (LiNixCoyMnzO2) (i.e., an anode-active material), carbon black (i.e., a conductive material), and PVDF (i.e., a hinder) with an NMP (N-methyl pyrrolidone) solvent to thereby obtain a slurry, coating the slurry on the positive electrode current collector 208, and drying the result. The positive electrode current collector 208 is preferably a thin-film aluminum foil that coextensively contacts the positive electrode layer 202.

The negative electrode layer 204 includes one or more lithium host material that is capable of storing intercalated lithium at a lower electrochemical potential relative to the positive electrode layer 202. An example of such lithium host material includes, but is not limited to, graphite. The graphite may be intermingled with one or more polymeric binder materials, such as PVdF, EPDM rubber, or CMC to provide the negative electrode with increased structural integrity. The negative electrode layer 204 may be fabricated by obtaining a slurry of graphite and coating the slurry on a negative electrode current collector 212, and drying the result. The negative electrode current collector 212 is preferably a thin-film copper foil that coextensively contacts the negative electrode layer 202.

The coated separator layer 205 includes a separator layer 206 having two opposite facing surfaces 207a, 207b. The separator layer 206 is formed of one or more porous inert polymer materials. Examples of such porous inert polymer materials include, but are not limited to, polyetherimide (PEI), polyvinylidene fluoride (PVdF), polyacrylonitrile (PAN), polymethyl methacrylate (PMMA), polyoxymethylene (POM), and mixtures thereof. The separator layer 206 functions as an electrically insulative mechanical barrier layer that physically separates the confronting inner face surfaces of the electrodes 202, 204 to prevent a short-circuit in the hybrid battery.

In the embodiment shown, each of the two opposite facing surfaces 207a, 207b is coated with an activated carbon layer 209a, 209b and a ceramic layer 211, in which the ceramic layer 211a, 211b is sandwiched between the separator layer 206 and respective activated carbon layer 209a, 209b. In alternative embodiments, at least one of the surfaces 207a, 207b may be coated with both a ceramic layer 211 and activated carbon layer 209; or with an activated carbon layer 209 without a ceramic layer 211; or one surface is coated with a ceramic layer and the other surface is coated with an activated carbon layer. The coated separator layer 205 is sufficiently porous to contain an electrolytic solution, which is in fluid communication with the activated carbon layers 209a, 209b, and positive and negative electrodes 202, 204. The thicknesses of each of the activated carbon layers 209a, 209b is between about 0.5 to 25 microns, the ceramic layers 211a, 211b is between about 0.5 to 5 microns, and the separator layer 206 is about 20 microns. The thicknesses are measured from the respective layers opposing surfaces.

The battery cell core is compressed into a compact object such that the negative electrode layer 204 and/or positive electrode layer 202 is in intimate contact with the respective activated carbon layer 209b, 209a. The activated carbon layer 209a, 209b and respective electrode 202, 204 effectively share the same positive current collector 208, 212 because of the intimate contact with each other, the relative thin thickness of the activated carbon layer 209a, 209b, and the good electron conductivity of the activated carbon layer 209a, 209b. Due to the relative thin thickness of activated carbon layer 209a, 209b the lithium ion (Li+) in the electrolyte will pass through the porosity, or gap, defined by adjacent carbon particles in the activated carbon layer 209a, 209b.

Figure 3B:
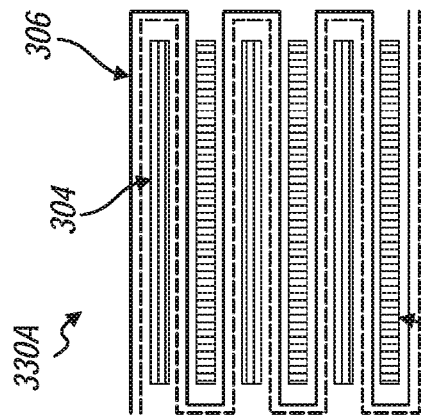
FIGS. 3A-3C is a schematic representation of an embodiment of a method of making a hybrid lithium ion capacitor battery, according to an exemplary embodiment.
Figure 3C:
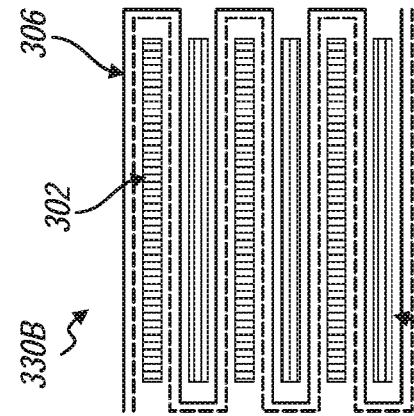
Figure 3A:
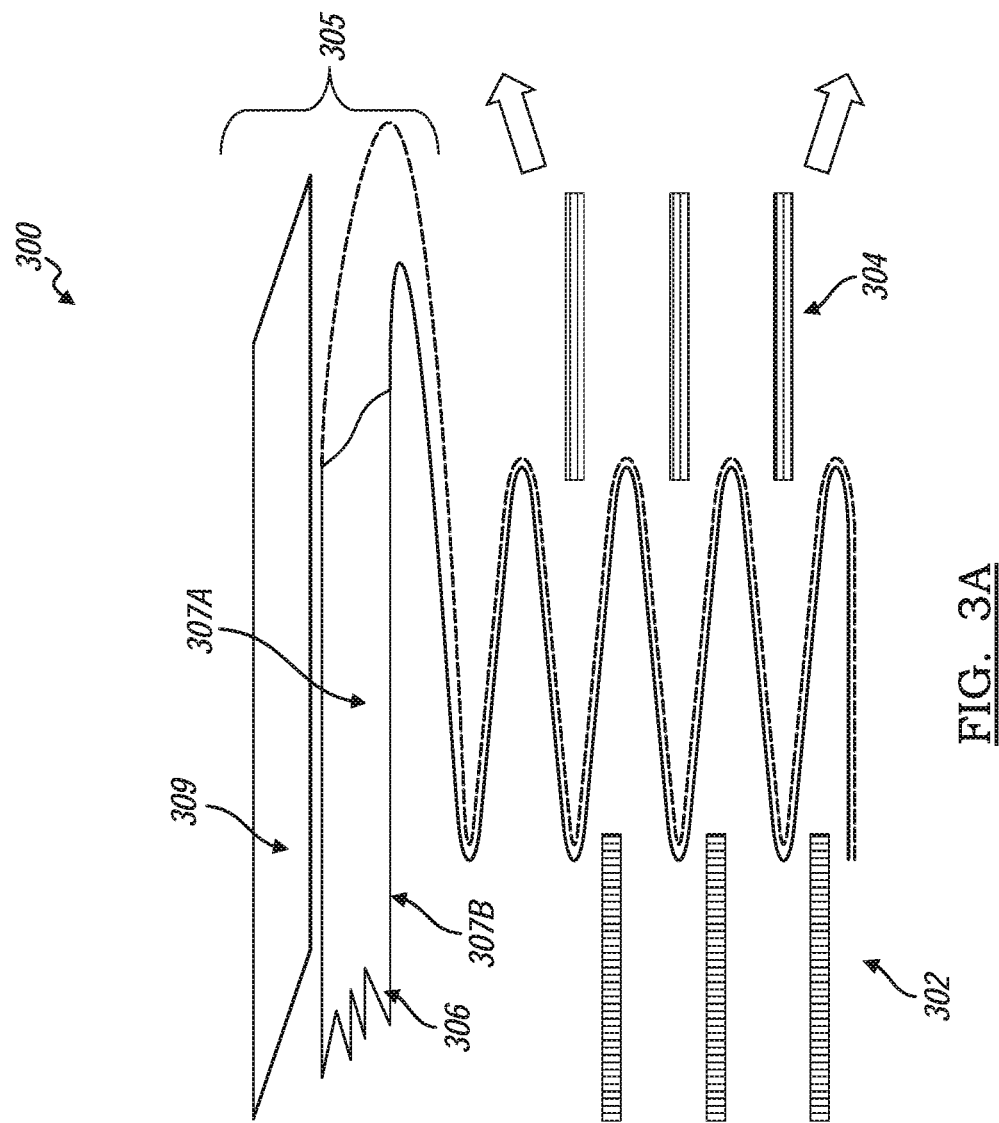

FIG. 3A through FIG. 3B show a method of making a hybrid battery cell stack by using a Z-typed stacking platform (also known as a zigzag method), generally indicated by reference number 300. The zigzag method of 300 includes stacking a first type electrode 302, a second type electrode 304, and a separator layer 306 separating the first type and second type electrodes 302, 304 in a zig-zagging pattern. At least one of the two opposing surfaces 307a, 307b of the separator layer 306 is coated with an activated carbon layer 309. The method 300 provides a battery cell stack having a first type electrode 302 and a second type electrode 304 alternately stacked with the separation layer 306 interposed therebetween. FIG. 3B shows a hybrid battery cell stack 330a where the first type electrode 302 is a negative electrode and the second type electrode 304 is a positive electrode. FIG. 3C shows a hybrid battery cell stack 330b where the first type electrode 302 is a positive electrode and the second type electrode 304 is a negative electrode.

The separator layer 306 may coated with a layer of activated carbon 309 thus defining a coated separator layer 305 and may be that of the coated separator 205 described above. The coated separator layer 305 is continuously folded in alternating directions into multiple Z configurations. A first type electrode 302 and a second type electrode 304 is alternatively inserted in each sequential fold. The battery cell stack 330a, 330b is then compressed together. It is preferable that that the number of folds are in the even numbers to provide an even number of alternating electrodes 302, 304. The battery cell stack 330a, 330b is then inserted into a battery container such as a battery pouch or a battery housing. A sufficient amount of electrolyte to impregnate the electrodes 302, 304 and the coated separator 305 is injected into the container and the container is then sealed under vacuum.

Figures 4A, 4B:
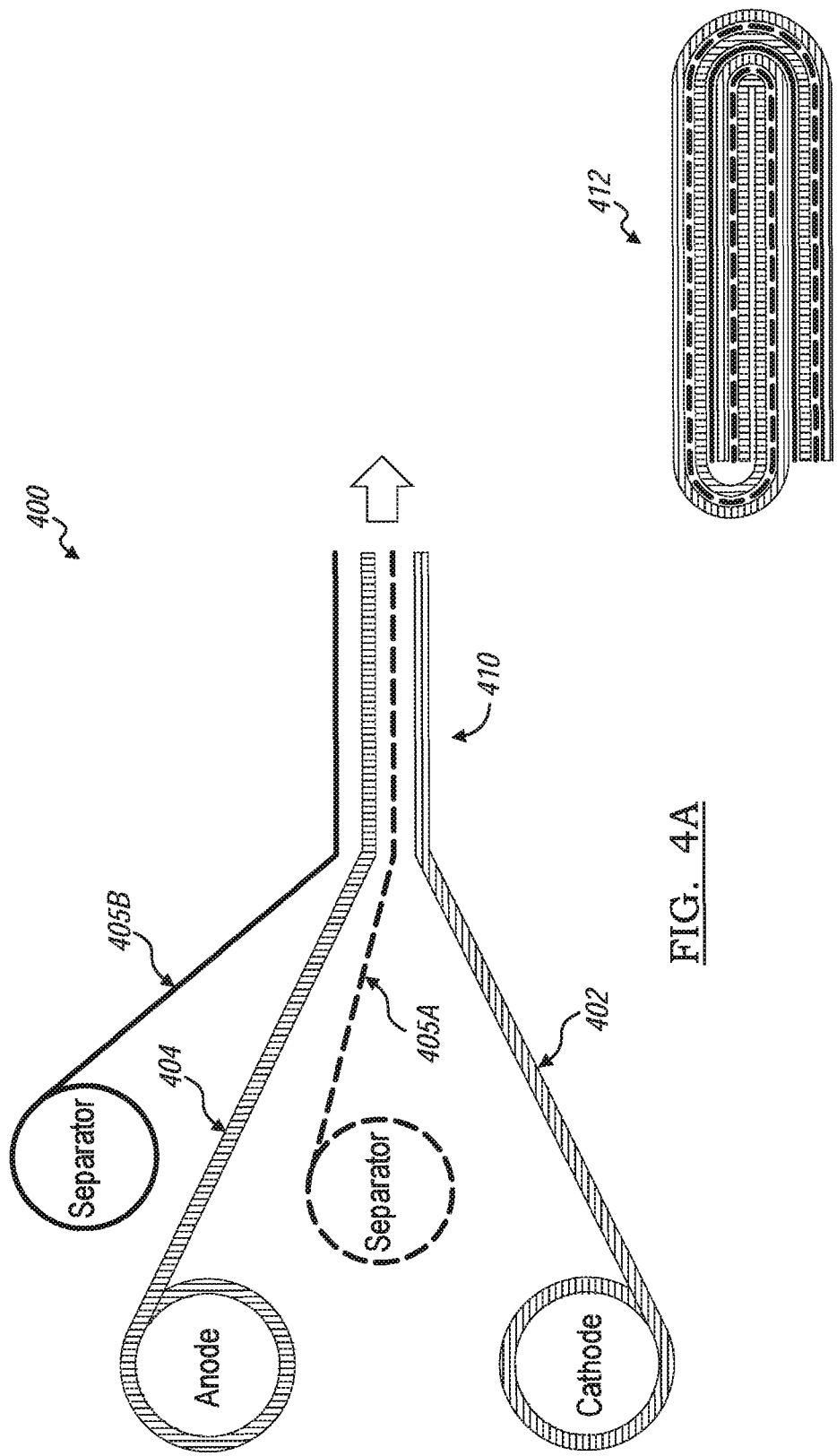
FIGS. 4A-4B is a schematic representation of an alternative embodiment of a method of making a hybrid lithium ion capacitor battery.

FIG. 4A and FIG. 4B show a method of making a hybrid battery stack, generally indicated by reference number 400, by winding a laminated battery cell (also known as jelly-rolling). The jelly-rolling is a method of winding a laminated of a first type electrode layer 402 and a second type electrode layer 404 with a coated separator layer 405 interposed therebetween. The coated separator layer 405 includes at least one surface coated with activated carbon layer thus forming a battery cell similar to the hybrid battery cell 200 as disclosed above.

Referring to FIG. 4A, a first coated separator layer 405a is sandwiched between a first type electrode layer 402 and a second type electrode layer 404. A second coated separator layer 405b may be applied to sandwich the second type electrode layer 404 between the first coated separator layer 405a and the second coated separator layer 405b. The first and second coated separator layers 405a, 405b may be similar as that of the coated separator layer 205 described above. The first type electrode layer 402, the first coated separator layer 405a, the second type electrode layer 404, and the second coated separator layer 405b are compressed into a laminated stack assembly 410.

The first type electrode layer 402 is one of a positive electrode layer and a negative electrode layer, and the second type electrode layer 404 is the other of the positive electrode layer and a negative electrode layer. The laminated stack assembly 410 is applied to a mandrel and wound to form a rolled battery stack 412. FIG. 4B shows a diagrammatic view of an end of the rolled battery stack 412. The jelly-rolled battery stack 412 is then inserted into a battery container such as a battery pouch or a battery housing. A sufficient amount of electrolyte to impregnate the jelly-rolled battery stack 412 is injected into the container and the container is then sealed under vacuum.

FIGS. 5A through 5E show yet another embodiment of a method of making a hybrid battery stacked cell, generally indicated by reference number 500. Referring to FIG. 5A, a first type electrode 502 is placed onto a stacking platform 503 rotatable about an A-axis. A portion of a continuous sheet of separator 505 is placed onto the first type electrode 502 thus covering the first type electrode 502. The separator 505 includes an activated carbon coating that may be continuously along the separator 505 or in multiple segments as shown in FIGS. 7A-7C. The first type electrode 502 and the separator sheet 505 is wound 180 degrees about the rotational A-axis. Referring to FIG. 5B, a second type electrode 504 is placed on a portion of separator sheet 505 advanced from the winding of the platform in FIG. 5A. The second type electrode 504 and the separator sheet is wound 180 degrees about the rotational A-axis. Referring to FIG. 5C, another second type electrode 504 is placed on a portion of separator advanced from the winding of the platform in FIG. 5B. The second type electrode 504 and the separator sheet is wound 180 degrees about the rotational A-axis. Referring to FIG. 5D, a first type electrode 502 is placed on a portion of separator advanced from the winding of the platform in FIG. 5C. The first type electrode 502 and the separator sheet is wound 180 degrees about the rotational A-axis. Referring to FIG. 5E, another first type electrode 502 is placed on a portion of separator advanced from the winding of the platform in FIG. 5D. The first type electrode 502 and the separator sheet is wound 180 degrees about the rotational A-axis. In other words, a first type electrode 502 is initially placed adjacent the separator sheet 505. For the next two turns (360 degrees) a pair of second type electrodes 504 are wounded sandwiching the previously wounded first type electrode 502. For the next two turns (360 degrees) a pair of first type electrodes 502 are wounded sandwiching the previously wounded second type electrode electrodes 504. The winding process continues so on and so forth up to a predetermined number of first and second types electrodes 502, 504 are wrapped between layers of wounded separate sheet 505.

FIG. 5F shows an end view of the wound battery stack 510. The first winding wraps a single first type electrode 502. The second and third 180 degrees winding sandwiches the single first type electrode 502 with a pair of second type electrodes 504. The fourth and fifth 180 degrees windings sandwiches previous wound electrodes between a pair of first type electrodes 502. The sixth and seventh 180 degrees windings sandwiches the previous wound electrodes between a pair of second type electrodes 504, and so on and so forth. The first type electrode 502 is one of a positive electrode and a negative electrode, and the second type electrode 504 is the other of the positive electrode and a negative electrode.

FIGS. 6A and 6B shows a method of making a non-continuously activated carbon coated separator layer. FIG. 6A shows a work piece separator sheet 604 extending along an X-axis. A plurality of activated carbon stripes 608 are coated onto the work piece separator sheet 604 in a direction perpendicular to the X-axis. The carbon stripes 608 are separated by stripes of non-coated surfaces 610. A width of the carbon stripes 608 is indicated by W and the distance between carbon stripes 608 is indicated by D. FIG. 6B shows the work piece separator sheet 604 cut into four sheets, or coated carbon layers, 606a-606d parallel to the X-axis.

FIGS. 7A-7C show a schematic representation of a method, generally indicated by reference number 700, of manufacturing a hybrid lithium ion capacitor battery having a non-continuously coated separator layer 705, The method of making the battery cell is the same as method 500. However, the difference is that the separator layer 705 includes a non-continuous coated segment 708 of activated carbon. The separator layer 705 includes alternating coated segments 708 and non-coated segments 710 along the length of the separator layer 705. The activated carbon coated segment 708 shown in FIGS. 7A through 7C includes a predetermined width (W) and a predetermined distance (D) between coated segments 708. The electrode 716 incudes a width (E). variation of the distance (D) between coated protons enable the surfaces of the electrode to be selectively contacted with the activated carbon segments 708.

FIG. 7A shows the activated carbon layer to have a width W of 1×E and a distance (D) of greater than 4×E. In this configuration, only one face of the same electrode type is in contact with the activated carbon coating.

FIG. 7B shows the activated carbon layer to have a length W=2×E and a distance D>2×E. In this configuration, both surfaces of a same type electrode is in contact with the activated carbon coating segment 708.

FIG. 7C shows the activated carbon layer to have a W=4×E and a distance D, which is the corner width of the cell core, less than E. In this configuration, only surfaces of a first type and a second type electrode are in contact with the activated carbon coating 708.

It should be noted that FIGS. 7A-C shows only one surface of the non-continuous activated carbon sheet selectively coated with a layer of activated carbon, it should be noted that the opposite surface may also be selectively coated with activated carbon. The width (W) and distance (D) shown are not meant to be so limited, but are presented for description purposes. Varies combinations of W and D provides for varies types of hybrid lithium capacitor cell designs and are intended to be within the scope of the presentation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A battery comprising:
a separator layer having a first surface;
a first electrode spaced apart from the first surface of the separator layer;
a first ceramic layer coated on the first surface of the separator layer; and
a first activated carbon layer disposed onto the first ceramic layer such that the first ceramic layer is sandwiched between the separator layer and the first activated carbon layer;
wherein the battery is a hybrid lithium ion capacitor battery.

2. The battery of claim 1, wherein the first activated carbon layer is in contact with the first electrode.

3. The battery of claim 2 further comprising a first current collector having a conductive foil coextensively contacting the first electrode.

4. The battery of claim 1, further comprising:
a second electrode spaced apart from a second surface of the separator layer;
a second ceramic layer coated on the second surface of the separator layer; and
a second activated carbon layer disposed onto the second ceramic layer such that the second ceramic layer is sandwiched between the separator layer and the second activated carbon layer.

5. The battery of claim 4, wherein the second activated carbon layer is in contact with the second electrode.

6. The battery of claim 4, wherein one of the first electrode and the second electrode comprises a lithium-based active material and the other of the first electrode and the second electrode comprises a graphite.

7. A coated separator layer for a battery, comprising:
a separator sheet comprising an inert polymer material sufficiently porous to contain an electrolytic solution, wherein the separator sheet includes a first surface;
a ceramic coating disposed onto the first surface of the separator sheet; and
an activated carbon coating disposed onto the ceramic coating such that the ceramic coating is sandwiched between the activated carbon coating and separator sheet;
wherein the battery is hybrid lithium ion capacitor battery.

8. The coated separator layer of claim 7, wherein the separator sheet includes a thickness of about 20 microns, the activated carbon coating includes a thickness of between about 0.5 to 25 microns, and the ceramic coating includes a thickness of between about 0.5 to 5 microns.

9. A method of making a battery, comprising the steps of:
placing a first-type electrode onto a stacking platform rotatable about an A-axis;
placing a first portion of a separator sheet onto the first-type electrode thus covering the first-type electrode, wherein the separator sheet includes a first surfaced coated with a ceramic layer and an activated carbon layer disposed onto the ceramic layer such that the ceramic layer is sandwiched between the separator sheet and the activated carbon layer;
winding the first-type electrode and the first portion of the separator sheet about the A-axis thus advancing a second portion of the separator sheet onto the stacking platform;
wherein the battery is a hybrid lithium ion capacitor battery.

10. The method of claim 9, further comprising the steps of:
placing a first second-type electrode onto the second portion of the separator sheet;
winding the first second-type electrode and the second portion of the separator sheet about the A-axis thus advancing a third portion of the separator sheet onto the stacking platform;
placing a second second-type electrode onto the third portion of the separator sheet; and
winding the second second-type electrode and the third portion of the separator sheet about the A-axis such that the first-type electrode is sandwiched between the first second-type electrode and the second second-type electrode.

11. The method of claim 10, wherein the activated carbon layer is in direct contact with at least one of the first-type electrode and the first second-type electrode.

12. The method of claim 11, wherein the first-type electrode is one of a cathode and an anode, and the second-type electrode is the other of the cathode and the anode.

* * * * *